(12) United States Patent
Noguchi et al.

(10) Patent No.: US 9,251,441 B2
(45) Date of Patent: Feb. 2, 2016

(54) APPARATUS, METHOD AND PROGRAM

(71) Applicant: CANON KABUSHIKI KAISHA, Tokyo (JP)

(72) Inventors: Takayoshi Noguchi, Tokyo (JP); Atsushi Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/254,713

(22) Filed: Apr. 16, 2014

(65) Prior Publication Data

US 2014/0313530 A1    Oct. 23, 2014

(30) Foreign Application Priority Data

Apr. 19, 2013    (JP) .................. 2013-088707

(51) Int. Cl.
*G06K 15/00*    (2006.01)
*G06K 15/02*    (2006.01)

(52) U.S. Cl.
CPC ............ *G06K 15/022* (2013.01); *G06K 15/002* (2013.01)

(58) Field of Classification Search
CPC ..................... G06K 15/022; G06K 15/002
USPC .................................. 358/1.12, 1.1
See application file for complete search history.

(56) References Cited

U.S. PATENT DOCUMENTS

| | | | |
|---|---|---|---|
| 6,721,060 B1* | 4/2004 | Kawamura et al. | 358/1.3 |
| 6,775,729 B1* | 8/2004 | Matsuo et al. | 710/263 |
| 2004/0184863 A1* | 9/2004 | Mori et al. | 400/621 |
| 2006/0268310 A1* | 11/2006 | Tamai et al. | 358/1.14 |
| 2010/0231960 A1* | 9/2010 | Kurata et al. | 358/1.15 |
| 2011/0211892 A1* | 9/2011 | Yasuzaki | 400/76 |
| 2011/0243637 A1* | 10/2011 | Nakamura et al. | 400/583 |

FOREIGN PATENT DOCUMENTS

JP    11-249346 A    9/1999

* cited by examiner

*Primary Examiner* — Martin Mushambo
(74) *Attorney, Agent, or Firm* — Canon USA, Inc. IP Division

(57) ABSTRACT

An apparatus includes a presenting unit and a control unit. The presenting unit presents a plurality of options for interrupt printing along with an amount of incompletely printed sheet to be discharged while images are being printed on both surfaces of a continuous sheet in accordance with a prior job. The control unit interrupts, when one of the plurality of options presented by the presenting unit is designated, the prior job in timing according to the designated option to execute an interrupt job.

19 Claims, 11 Drawing Sheets

FIG. 7A

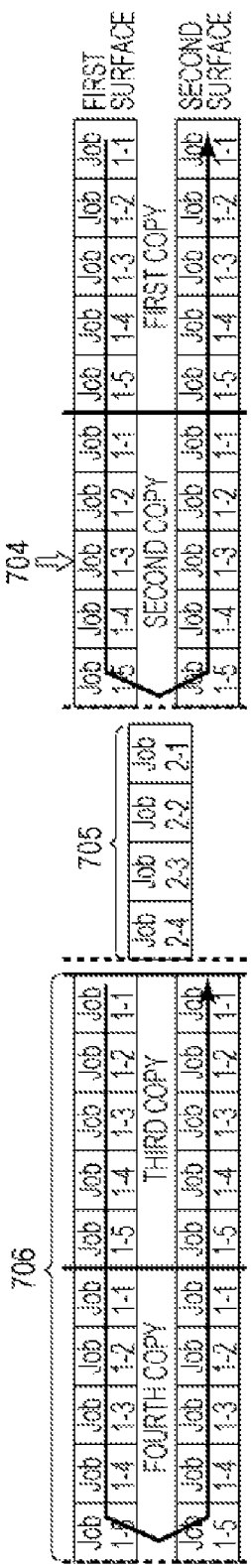

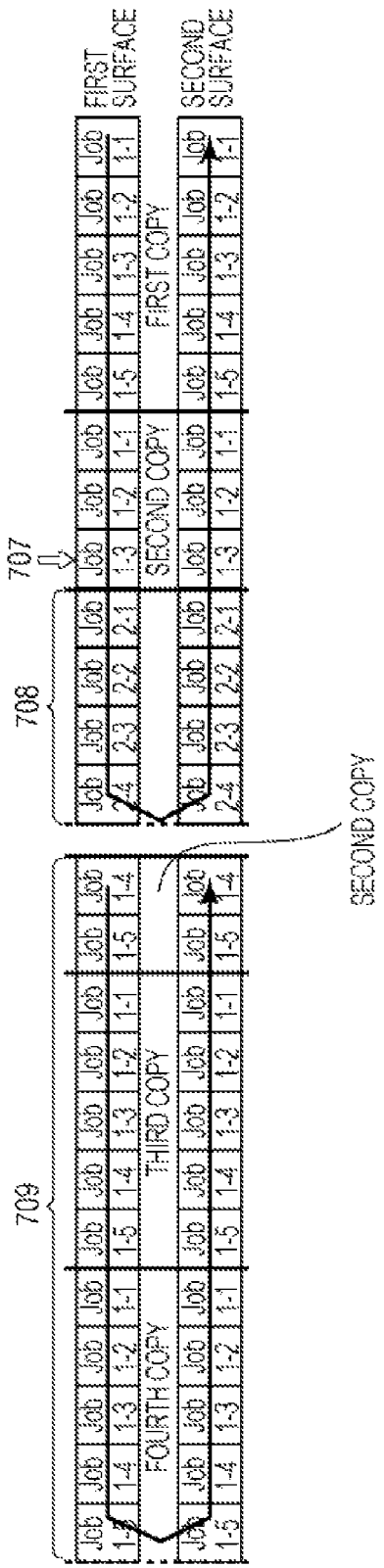

APPARATUS, METHOD AND PROGRAM

BACKGROUND OF THE INVENTION

1. Field of the Invention

The present invention relates to a print control apparatus, method and program which cause printing by using a continuous sheet.

2. Description of the Related Art

In order to print images on both surfaces of a continuous sheet such as roll paper, there has been provided a technology in the past (see Japanese Patent Laid-Open No. 11-249346) which prints on one surface of a continuous sheet installed in a printing unit, then cuts the continuous sheet, temporarily reels it, and re-installs the continuous sheet to the printing unit. For efficient printing, such a printing apparatus performs printing on one surface for a plurality of pages continuously and performs printing on the other surface after the printing on the one surface for all pages. This procedure may realize efficient double-side printing. For example, a procedure as illustrated in FIG. 8A may be performed in order to perform double-side printing including printing four copies of five pages of images on a first surface and a second surface of a sheet. In other words, pages on the first surface of each copy are printed first. After the final page of the fourth copy is printed, a sheet is cut (801) and is reversed. Then, the second surface is printed from the fourth copy, and the first copy is printed last. Thus, the double-side printing for four copies is completed where a unit 802 is handled as one copy.

When an interrupt printing is performed in middle of a printing procedure as illustrated in FIG. 8A, there may occur problems as follows.

For example, as illustrated in FIG. 8B, a case may be assumed in which an interrupt job 2 (803) having two pages occurs in middle of printing on the first surface of the second copy. In this case, the sheet is cut in middle of the first surface of the second copy (after printing the third page in FIG. 8B, and the interrupt job 2 (803) is executed. Because the second surface of the first copy and second copy are not printed by the job 1 that has been executed before the interrupt printing, it results in an incomplete printed material (804). Therefore, printing (805) from the first copy is required again. This wastes the printing material before the interrupt occurs and lowers the printing efficiency because of performing the same printing process again.

SUMMARY OF THE INVENTION

An apparatus according to the present invention includes a presenting unit configured to present a plurality of options for interrupt printing along with an amount of incompletely printed sheet to be discharged while images are being printed on both surfaces of a continuous sheet in accordance with a prior job, and a control unit configured to interrupt, when one of the plurality of options presented by the presenting unit is designated, the prior job in timing according to the designated option to execute an interrupt job.

Further features of the present invention will become apparent from the following description of exemplary embodiments with reference to the attached drawings.

BRIEF DESCRIPTION OF THE DRAWINGS

FIGS. 7A to 7C illustrate printing order when interrupt printing is executed.

FIGS. 8A and 8B illustrate printing order when interrupt printing is executed.

DESCRIPTION OF THE EMBODIMENTS

Embodiments of the present invention will be described below with reference to the appended drawings. Relative arrangements of components and forms of an apparatus according to embodiments are given for illustration purpose only, and the present invention is not limited thereto.

Figure 1:
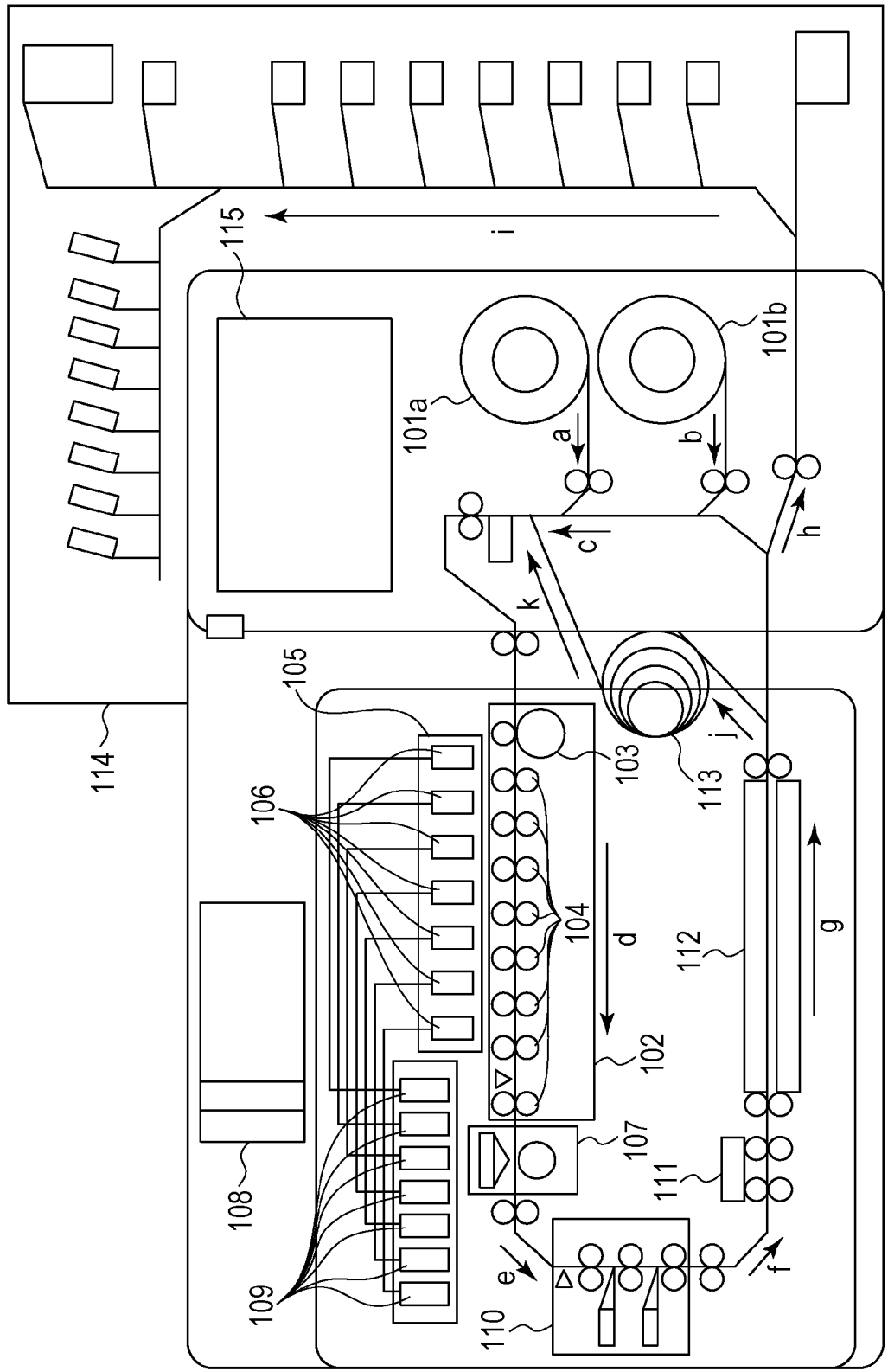
FIG. 1 illustrates a configuration of an exemplary image forming apparatus of an embodiment of the present invention.

FIG. 1 illustrates a schematic configuration of an image forming apparatus that is an example of a print control apparatus according to this embodiment. Illustrating in FIG. 1 an image forming apparatus having a print function of printing data received from an external device, an embodiment of the present invention is not limited thereto. An embodiment of the present invention is applicable to an apparatus further including a scanner that scans an image on a document for functioning as a copy machine or to a multifunction system further including other functions.

A roll sheet is extemporarily applied as a recording agent (medium or recording sheet to be printed) in the following description. The roll sheet is an example of a continuous sheet, but it does not have to be rolled as far as it is a long sheet that allows printing of a plurality of pages on one surface without cutting in middle of the printing process. The continuous sheet may be cut automatically by the image forming apparatus or may be cut in response to an instruction manually input by a user. The material of the recording agent is not limited to paper but may vary as far as it allows print processing. The image forming apparatus may not only perform printing on a continuous sheet but also perform printing on sheets that are precut in a predetermined size.

The printing method is not limited to inkjet type image printing using liquid ink for image printing, which will be described below. The recording material to be applied to the recording agent may be solid ink. Various methods are applicable such as electronic photography using toner, sublimation printing, thermal transfer method, and dot impact method. An embodiment of the present invention is not limited to color recording using recording materials of a plurality of colors but may be monochromatic recording by using one in black (including gray). The printing is not limited to printing of a visible image but may be printing of an invisible image or an image that is difficult to visually recognize or, excluding general images, may vary such as printing of a wiring pattern, a physical pattern in a component manufacturing process or a DNA base arrangement. In other words, an embodiment of the present invention is applicable to various types of recording device as far as it may apply a recording material to a recording agent. In a case where an operation of a printing process in the image forming apparatus in FIG. 1 is controlled in accordance with an instruction from an external device connected to the image forming apparatus, the external device may be the print control apparatus.

FIG. 1 is a cross section view schematically illustrating an overall configuration of an image forming apparatus using a roll sheet (continuous sheet that is longer than the length of a print unit (1 page) in a conveying direction) as a recording agent. The image forming apparatus includes the following components 101 to 115 which are disposed in one chassis. However, these components may be disposed in a plurality of chassis.

A control unit 108 internally contains a control unit having a controller (including a CPU or an MPU), an output device for user interface information (such as a display information or acoustic information generating device) and an I/O interface and is responsible for control over the image forming apparatus.

Two cassettes including an upper sheet cassette 101a and a lower sheet cassette 101b are provided as a unit configured to hold and feed a roll sheet. A user may first mount a roll sheet (hereinafter, called a sheet) on a magazine and install it to an image forming apparatus body. A sheet pulled out from the upper sheet cassette 101a is conveyed in the direction a in FIG. 1, and a sheet pulled out from the lower sheet cassette 101b is conveyed in the direction b in FIG. 1. A sheet from any of the cassettes advances in the direction c in FIG. 1 and reaches a conveying unit 102. The conveying unit 102 conveys a sheet in the direction d (horizontal direction) in FIG. 1 during print processing through a plurality of rotation rollers 104. In order to change the source sheet cassette from one to the other, a sheet that has already been pulled out is rolled back into the cassette, and a sheet is fed from the cassette holding the sheet to be fed in turn is set.

A head unit 105 is provided above the conveying unit 102 such that it may be opposite to the conveying unit 102. The head unit 105 holds independent print heads 106 for a plurality of colors (seven colors in this embodiment) along a sheet conveying direction. In this embodiment, seven print heads are provided in correspondence with seven colors of C (cyan), M (magenta), Y (yellow), LC (light cyan), LM (light magenta), G (gray), and K (black). It is apparent that other colors may be used, and all of those colors are not required to use.

The image forming apparatus forms an image on a sheet by ejecting ink from the print heads 106 in synchronization with the conveyance of the sheet by the conveying unit 102. The print heads 106 are disposed such ink may be ejected by avoiding the rotation rollers 104. Instead of direct discharge of ink to a sheet, ink may be applied to a middle transfer body and the ink may then be applied to a sheet to form an image.

These conveying unit 102, head unit 105 and print heads 106 are contained in the printing unit according to this embodiment.

An ink tank 109 independently stores inks of colors. Ink is supplied from the ink tank 109 to sub tanks provided correspondingly to the colors through tubes. Ink is supplied from the sub tanks to the corresponding print heads 106 through tubes. The print heads 106 have line heads corresponding to colors (7 colors in this embodiment) along the conveying direction d for printing. The line heads corresponding to colors may be a single seamless nozzle chip or may be divided nozzle chips aligned in one line or in a regular pattern such as a staggered array. According to this embodiment, a what-is-called full multi-head is applied which has nozzles in a range covering the width of a printable area of a sheet having a maximum size supported by the image forming apparatus. The inkjet method for ink discharge from nozzles may be a method using a heating element, a method using a piezoelectric element, a method using an electrostatic element, a method using a MEMS element or the like. Ink is ejected from nozzles of heads on the basis of print data, and the discharge timing is determined in accordance with an output signal from a conveyance encoder 103.

The width of the print heads 106 is longer than the width of a sheet supported by the image forming apparatus, and ink is not ejected from all of the nozzles for one recording. For maintenance of the print heads 106, the print heads 106 are caused to eject ink onto a sheet through all nozzles by moving the print heads 106 in a direction orthogonal to the sheet conveying direction (Y movement).

After an image is formed on a sheet, the sheet is conveyed from the conveying unit 102 to a scanner unit 107. The scanner unit 107 optically scans the printed image or a special pattern on the sheet to determine whether the printed image has any defect or not or check the conditions of the image forming apparatus including an ink discharge state. A printed image may be checked by checking an ink discharge state of a scanned pattern for checking a state of a head or the success/failure of printing on the basis of a result of comparison with an original image. Any proper one of various checking methods may be selected.

The sheet is conveyed in the direction e in FIG. 1 from vicinity of the scanner unit 107 and is installed in a cutter unit 110. The cutter unit 110 cuts the sheet into lengths of predetermined print units. The length of the predetermined print unit may differ in accordance with the size of an image to be printed. For example, the length in a conveying direction may be equal to 135 mm for an L-type picture. The length in a conveying direction may be equal to 297 mm for an A4 size picture. Though the cutter unit 110 cuts a sheet into pages for one-side printing, it may not cut a sheet into pages for some contents of print jobs. For double-side printing, the cutter unit 110 may not cut a first surface (a surface subject to printing first, such as a front side) of a sheet into pages. Images are continuously printed on a sheet having a predetermined length, and the sheet is cut into pages when printing on a second surface (surface subject to subsequent printing, such as a reverse side). The cutter unit 110 is not limited to one that cuts a sheet for each image in one-side printing or a second surface printing process in double-side printing. The cutter unit 110 may not cut until a sheet is conveyed by a predetermined length and cut after the sheet is conveyed by the predetermined length. Then, another cutter device may cut off the sheet every image on one sheet (or one page) by a manual operation, for example. The width of a sheet may be cut if required by using another cutter device.

A sheet conveyed from the cutter unit 110 is conveyed in the direction f in FIG. 1 within the cutter unit 110 and is conveyed to a second-surface printing unit 111. The second-surface printing unit 111 is configured to print predetermined information on a second surface of a sheet when an image is printed on one surface of the sheet only. The term "second surface" here refers to a reverse side of the surface where an image based on an input print job is printed of a sheet to be used for printing. Information to be printed on the second surface of a sheet may include information such as a character, mark, and code (such as an order management number) corresponding to an image to be printed. When the print heads 106 print an image for a print job of double-side printing, the second-surface printing unit 111 prints information as described above on a region excluding a region where the print heads 106 print an image. The second-surface printing unit 111 may apply dot impact printing, sealing of a recording material, thermal transfer printing, ink-jet printing or the like.

A sheet having passed through the second-surface printing unit 111 is next conveyed to a drying unit 112. In order to quickly dry a sheet on which ink is attached, the drying unit 112 is configured to heat with a warm air (heated air) a sheet passing in the direction g in FIG. 1 within the drying unit 112. The drying method may vary such as using cool air instead of a warm air, heating with a heater, natural drying by leaving, and irradiation of electromagnetic waves of an ultraviolet ray, for example. Sheets cut into a unit length in printing passes through the drying unit 112 one by one and are conveyed in the direction h in FIG. 1 to a sorting unit 114.

The sorting unit 114 holds a plurality of trays (18 trays in this embodiment) and distinguishes the tray to which a given sheet is discharged in accordance with the length of the print unit. A tray number is assigned to each tray. The sorting unit 114 discharges a sheet passing in the direction i within the sorting unit 114 to a tray corresponding to the tray number set for each image to be printed by detecting the availability of the tray or whether the tray is fully loaded with sheets or not by using a sensor provided on each tray. The tray to which cut sheets are to be discharged may be specifically designated by a source of a print job (host apparatus), or an available tray may be arbitrarily designated therefor in the image forming apparatus. A predetermined number of sheets may be discharged to one tray. For a print job for a higher number of sheets than the predetermined number of sheets, the sheets may be discharged over a plurality of trays. The number, size, and type of sheets that may be discharged to a tray or trays may vary in accordance with the size (type) of the tray. In FIG. 1, the vertically (top to bottom) aligned trays (hereinafter, large trays) may accept large size (larger than L-type size such as A4 size) and small size (L-type size) sheets. The horizontally (right to left) aligned trays (hereinafter, small trays) may accept small size (L-type size) sheets but does not accept large size sheets. More number of sheets may be discharged by the large tray than the small tray. A state such as "discharging sheets" or "discharge completed" may be identifiable by a user from an indicator (such as an LED). For example, a plurality of LEDs which emit light beams of different colors from each other may be provided for each tray, and a user may be informed of various states of each tray on the basis of the color of an LED that illuminates or whether the indicator has an illuminating state or a blink state. Priority order may be given to a plurality of trays, and the image forming apparatus 200 assigns available trays (without sheets) as discharge destinations of sheets in accordance with the priority order when a print job is executed. At default, upper large trays have higher priorities, and small trays closer to the left have higher priorities. Large trays have higher priorities than smaller trays. Such priority order may be preset such that a tray at a position where a user may take out a sheet easily may have a higher priority. Alternatively, it may be changed properly by a user operation, for example.

A sheet winding unit 113 is configured to wind a sheet that has not been cut into pages and has its first surface printed. For double-side printing, a sheet the first surface of which having undergone image formation is first not cut into pages by the cutter unit 110 and is cut after the printing on the continuous first surface ends. A sheet having its first surface printed passes in the direction j in FIG. 1 within the sheet winding unit 113 and is wound by the sheet winding unit 113. After image formation on the first surface for a series of pages completes, the wound sheet is reversed such that the reverse surface of the first surface is set as a printable surface, that is, the surface facing the print heads 106 may be reversed and is conveyed in the direction k in FIG. 1 again within the sheet winding unit 113. This conveyance allows image printing on the reverse second surface of the first surface. For normal one-side printing, a sheet having an image printed is conveyed to the sorting unit 114 without winding by the sheet winding unit 113.

In this way, in order to perform double-side printing on a sheet, the sheet winding unit 113 is used to wind the sheet, reverse the sheet so that printing may be performed on the second surface. Thus, a sheet to be discharged to the sorting unit 114 has a different surface up between printing on one surface of the sheet only and printing on both surfaces of the sheet. In other words, for one-side printing, because a sheet is not reversed by the sheet winding unit 113, the sheet having an image for the first page printed is discharged with the image for the first page facing down. In order to execute one print job for a plurality of pages, a sheet for the first page is discharged to a tray, and sheets for subsequent pages are sequentially discharged and are piled. This type of discharge will be called a face-down discharge. On the other hand, for double-side printing, because a sheet is reversed by the sheet winding unit 113, a sheet having an image for the first page printed is discharged with the image for the first page facing up. In order to execute one print job that outputs a plurality of sheets, a sheet containing the last page is first discharged to a tray, and sheets containing pages with lower page numbers are sequentially discharged and are piled. Finally, a sheet having an image for the first page printed is discharged. This type of discharge will be called a face-up discharge. In order to discharge a same surface of sheets up for one-side printing and double-side printing (either face-up or face-down discharge), the printing order of the first surface may differ (descending order or ascending order) between one-side printing and double-side printing.

An operation unit 115 is configured to allow various user operations and notify various kinds of information to a user. For example, a printing condition for each order may be checked therewith including the tray having a sheet having an image designated by a user printed or whether the image is currently being printed or the image has been printed completely. Further, a user may operate/check the operation unit 115 to check a remaining ink amount, a remaining sheet amount, a status of the apparatus or to instruct implementation of maintenance on the apparatus such as head cleaning.

Figure 2:
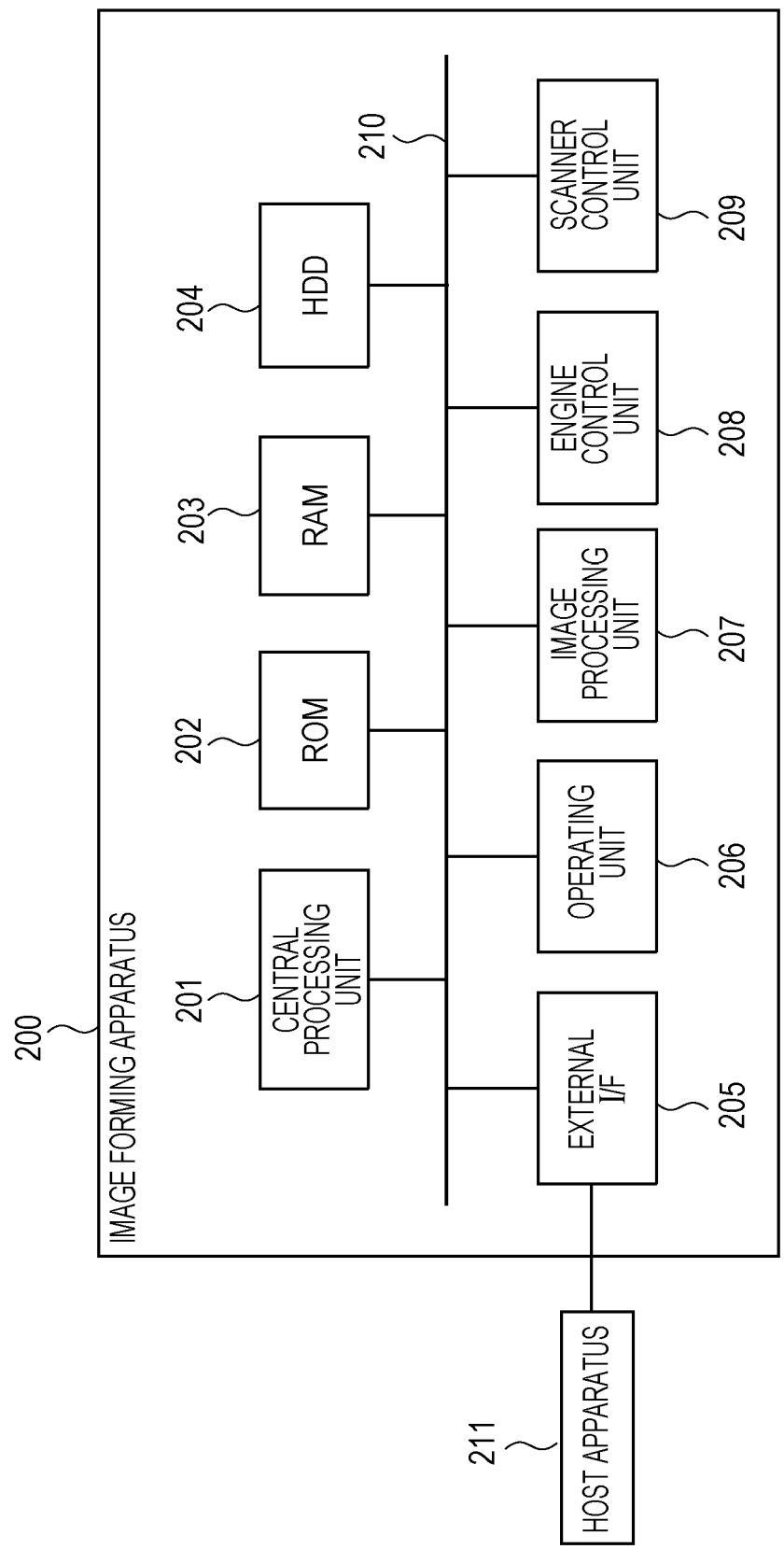
FIG. 2 is a block diagram illustrating a configuration relating to control of the image forming apparatus in FIG. 1.

FIG. 2 is an explanatory block diagram of a configuration involved in control in the image forming apparatus illustrated in FIG. 1. The image forming apparatus 200 is the image forming apparatus illustrated in FIG. 1.

The control unit 108 mainly includes a CPU 201, a ROM 202, a RAM 203, an image processing unit 207, an engine control unit 208, and a scanner control unit 209. An HDD 204, an operating unit 206, and an external I/F 205 are connected to the control unit 108 through a system bus 210, for example.

The CPU 201 is a central processing unit of a microprocessor (microcomputer) type and is included in the control unit 108 in FIG. 1. The CPU 201 controls overall operations of the image forming apparatus 200 by executing a program and/or activating hardware. The ROM 202 stores fixed data required for a program to be executed by the CPU 201 or an operation of the image forming apparatus 200. The RAM 203 may be used as a work area for the CPU 201 as a temporary storage area for various received data or may store setting data. Setting information required for a program to be executed by the CPU 201, print data and/or an operation of the image forming apparatus 200 may be stored in and be read from an internal hard disk of the HDD 204. The HDD 204 further establishes a queue for managing print jobs and sequentially registers jobs imported to the image forming apparatus 200 with the queue. Other large capacity memory device may be used in stead of the HDD 204. A flowchart which will be described below illustrates a flow of a process by the CPU 201 including loading a program code stored in the ROM 202 or the HDD 204 into the RAM 203 and executing it.

The operating unit 206 includes a hard key or a touch panel which allows a user to perform various operations and a display unit that presents (notify) various information to a user and corresponds to the operation unit 115 in FIG. 1. Alternatively, information may also be presented to a user by outputting audio (such as a beep or a sound) based on acoustic information from an audio generation device.

The image processing unit 207 performs image processing such as rasterizing (converting) print data (such as data described in page description language) handled in the image forming apparatus 200 to image data (bitmap image). A color space (such as YCbCr) of image data contained in input print data is converted to a normal RGB color space (such as sRGB). Furthermore, various kinds of image processing are performed on image data such as resolution conversion to an effective pixel count (which supports print processing by the image forming apparatus 200), image analysis, and image correction. Image data acquired through those types of image processing are stored in the RAM 203 or HDD 204. Furthermore, the image processing unit 207 and the external I/F 205 may supply power independently from the main power supply of the image forming apparatus 200. Thus, when a print job is received from the host apparatus 211 in a state that the main power supply is off, partially image-processed data may be stored in the HDD 204. Turning off the main power supply of the image forming apparatus 200 and causing the image processing unit 207 to supply power may put a maintenance process into a standby state as a job in the HDD 204.

The engine control unit 208 is configured to control processing of printing an image based on print data on a sheet in accordance with a control command received from the CPU 201, for example. The engine control unit 208 may instruct ink ejection to the print heads 106 for colors, sets ejection timing for adjusting dot positions (ink impact positions) on a printing medium, and adjust based on an acquired head drive state. The engine control unit 208 may perform drive control over print heads in accordance with print data to cause the print heads to eject ink, forming an image on a sheet. The engine control unit 208 may further controls a conveying roller including instructing to drive a delivery roller that draws a sheet from a cassette, instructing to drive a conveying roller that conveys a drawn sheet, and acquiring a rotation condition of the conveying roller to convey at a proper speed and through a proper path and stop the sheet.

The scanner control unit 209 is configured to control an image sensor in accordance with a control command received from the CPU 201, for example and may scan an image on a sheet, acquire red (R), green (G) and blue (B) analog luminance data color and convert the data to digital data. The image sensor may be a CCD image sensor, a CMOS image sensor or the like. Alternatively, the image sensor may be a linear image sensor or an area image sensor. The scanner control unit 209 may further instruct to drive an image sensor, acquire a condition of the image sensor based on the driving, analyzes luminance data acquired from the image sensor, and detect non-ejection of ink from the print head or print heads 106 and/or a cut position of a sheet. A sheet that is determined by the scanner control unit 209 as having an image printed correctly undergoes a drying process for ink on the sheet and then is discharged to a designated tray in the sorting unit.

The host apparatus 211 corresponds to the aforementioned external device and is externally connected to the image forming apparatus 200 and supplies image data to be printed by the image forming apparatus 200 and issues orders for various print jobs.

The host apparatus 211 may be implemented by a general-purpose personal computer (PC) or may be another type of data supply apparatus. The other type of data supply apparatus may be an image capture apparatus which captures an image to generate image data. The image capture apparatus may be a reader (scanner) that reads an image on a document to generate image data or a film scanner that reads negative or positive film to generate image data. Another example of the image capture apparatus may be a digital camera that captures a still image to generate digital image data or digital video recorder that captures video to generate moving picture data. Alternatively, a photo-storage may be provided over a network, or a socket may be provided to which detachable portable memory is inserted so that image file stored in the photo storage or portable memory is read out to generate and print image data. Instead of a general purpose PC as described above, various data supply apparatuses may be applied including a terminal specific to the image forming apparatus. Such a data supply apparatus may be a component of the image forming apparatus or a separate apparatus externally connected to the image forming apparatus. When the host apparatus 211 is a PC, an OS, application software that generates image data, and a printer driver for the image forming apparatus 200 may be installed in a memory device in the PC. The printer driver may control the image forming apparatus 200 and convert image data supplied from application software to a format supported by the image forming apparatus 200 to generate print data. The conversion from print data to image data may be performed in the host apparatus 211, and the resulting data may be supplied to the image forming apparatus 200. It is not required to implement all of the aforementioned processes by software, but a part or all of them may be implemented by hardware such as an application specific integrated circuit (ASIC). Image data, other commands, status signals and so on supplied from the host apparatus 211 may be transmitted and received to and from the image forming apparatus 200 through the external I/F 205. The external I/F 205 may be a local I/F or a network I/F. The external I/F 205 may apply wired connection or wireless connection.

The aforementioned components within the image forming apparatus 200 may be connected through the system bus 210 for mutual communication.

While one CPU 201 controls all components within the image forming apparatus 200 illustrated in FIG. 2 in the example above, other configurations excluding it are applicable. In other words, some of function blocks may include their own CPUs, and the corresponding CPUs may perform the control separately. Various configurations may be possible in which the function blocks may be assigned differently from the configuration illustrated in FIG. 2 to separately function as a processing unit or a control unit or some of them may be merged. Data may be read out from a memory through a Direct Memory Access Controller (DMAC).

Figure 3:
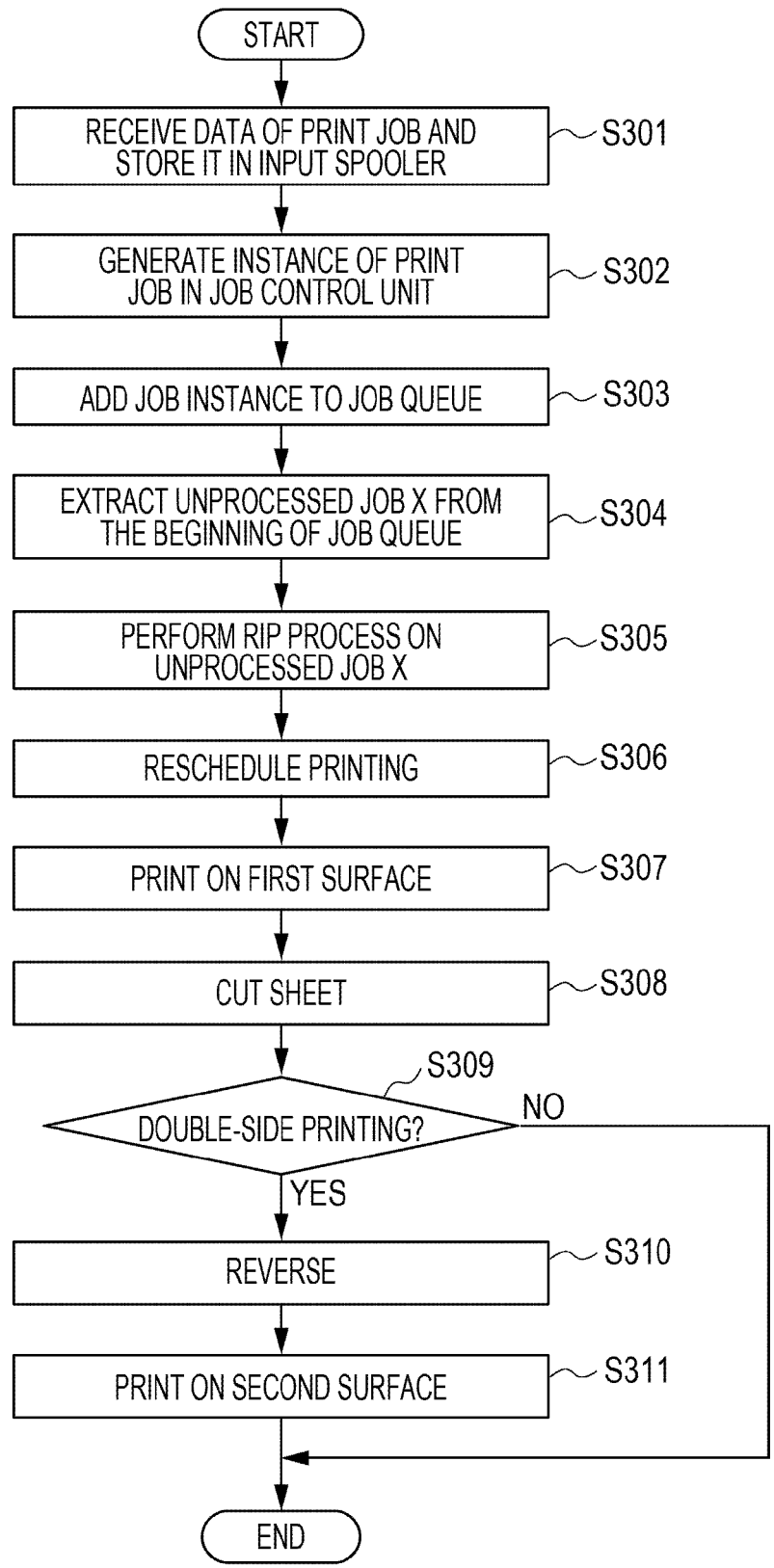
FIG. 3 is a flowchart illustrating a flow of processing according to an embodiment.

Next, a flow of normal print processing by the image forming apparatus 200 will be described. FIG. 3 is a flowchart illustrating a flow of the processing.

First, in step S301, print job data is input. A print job transmitted from the host apparatus 211 is received and is stored in an input spooler provided in the HDD 204. Next, in step S302, an instance of a job is generated which holds information describing a print attribute and print data storage region associated with the received print job. In step S303, the job instance is added to a job queue provided in the HDD 204.

Next, in step S304, an unprocessed job X (the first job of the queue) is extracted in order of storing to the job queue. In step S305, raster image processing (RIP) is performed in the image processing unit 207.

Figures 8A, 8B:
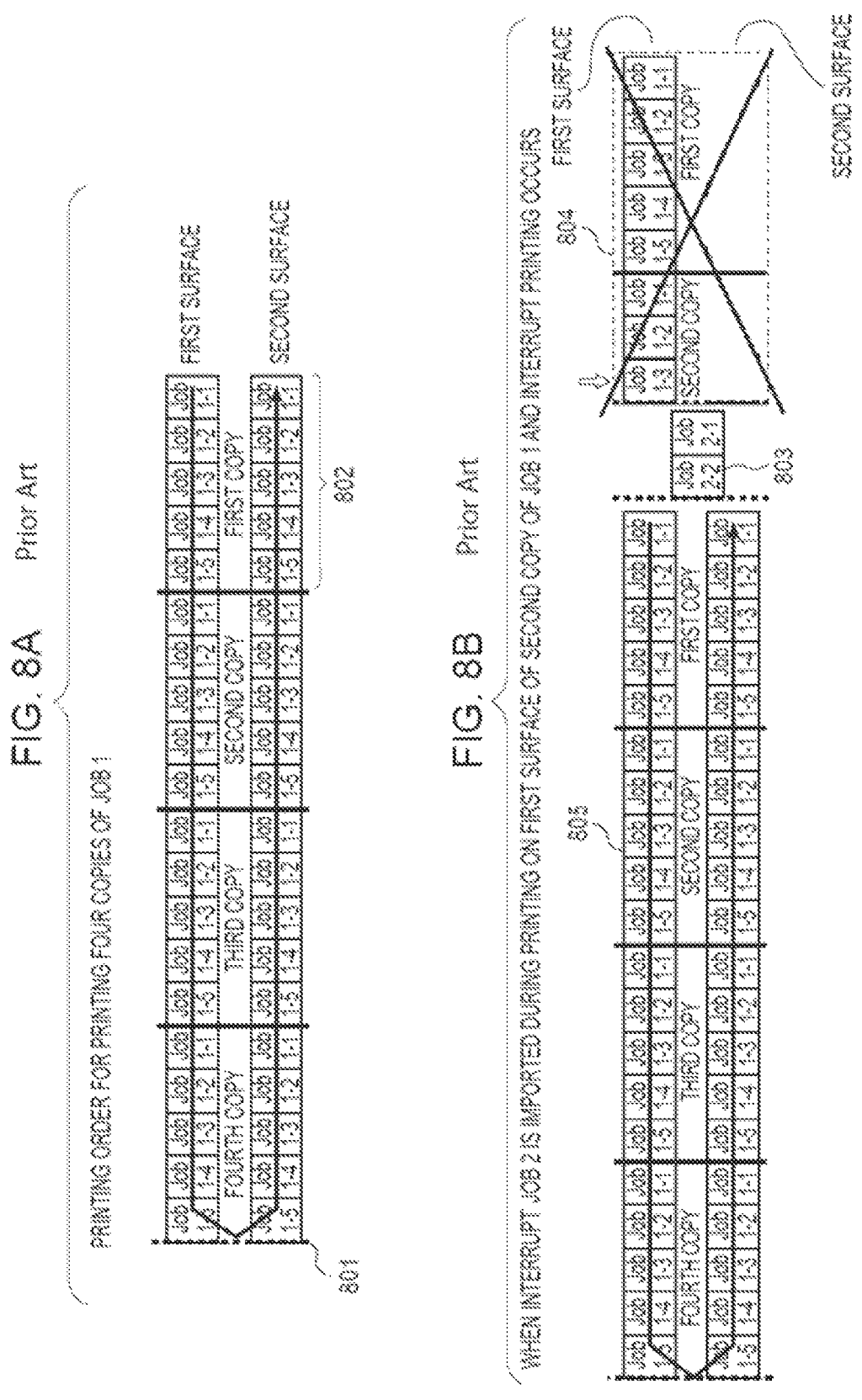

In step S306, printing is re-scheduled in consideration of an attribute (such as printing state, sheet type, double-side/one-side printing, and designated number of copies) of a job being processed preceding and an attribute of the job X. For example, if print attributes such as sheet types and designated double-side/one-side printing of the prior job in printing and the job X agree and if the job has a state before printing on a second surface is started in double-side printing, printing may be performed on the first surface of the job X continuously to the first surface of the prior job. If the prior job has a state that the printing has already started on the second surface in double-side printing, the job X is executed continuously. Therefore, the printing of the job X is started after the printing of the prior job completes. On the other hand, those jobs have different print attributes, a sheet may be required to be cut or be change. Therefore, the printing of the prior job and the job X may not perform continuously. In this way, when a plurality of jobs having a same print attribute are imported in series, they may be handled as one group. Printing may be performed on the first surfaces of all jobs belonging to the group first, the sheet is reversed, and printing may be performed on the second surface of the all jobs, implementing double-side printing which uses a roll sheet efficiency. As illustrated in FIGS. 8A and 8B, the same idea may be applied to a job designated for a plurality of copies. The printing may be scheduled such that the printing may be performed on the first surface for the designated number of copies first and printing on the second surface may be performed then.

In step S307, printing on the first surface of the job X is performed first. In this case, if the job X is designated for a plurality of copies, printing is repeatedly performed on the first surface for the designated number of copies first, as illustrated in FIG. 8A. After the printing on the first surface ends, the sheet is cut in step S308. In step S309, whether the job X is for double-side printing or one-side printing is checked. For double-side printing, the print processing ends in step S310. For one-side printing, the print processing ends here.

In step S310, the sheet winding unit 113 reverses the sheet. In step S311, printing on the second surface is performed. In this case, the printing is performed on the first surface in the reverse printing order, as illustrated in FIG. 8A.

Figure 4A:
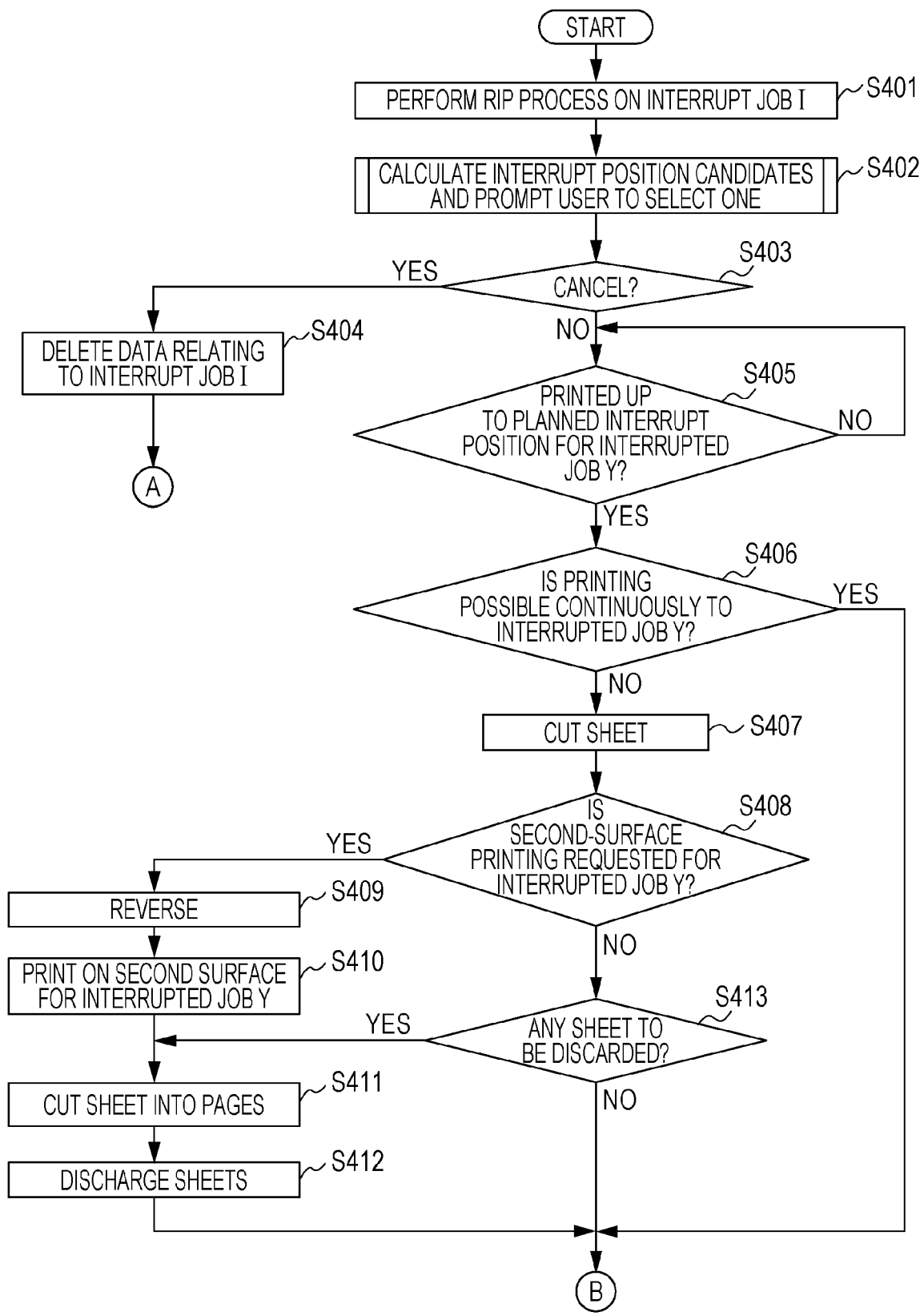
FIGS. 4A and 4B are flowcharts illustrating a flow of processing according to an embodiment.
Figure 4B:
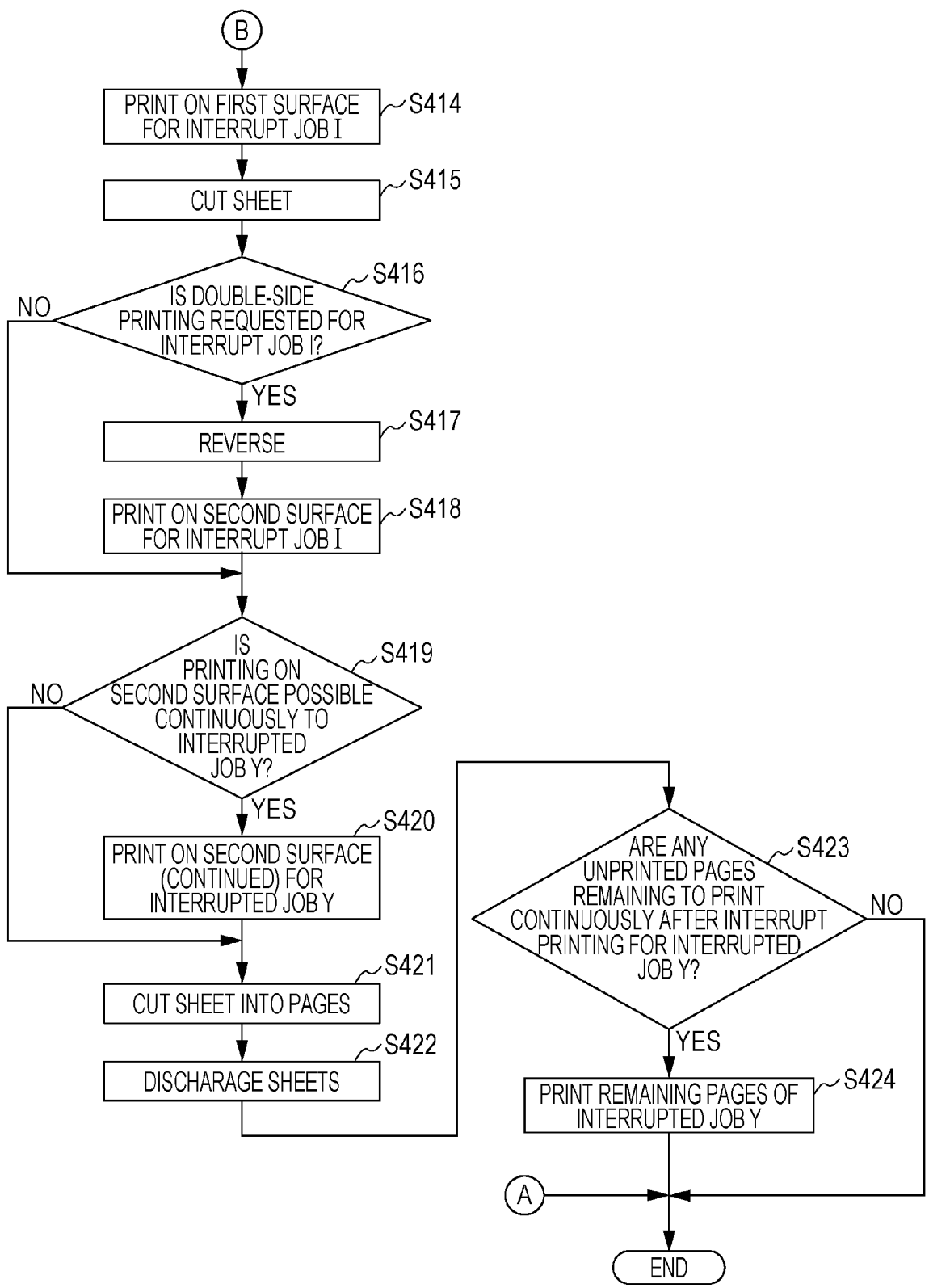

Next, processing in a case where an interrupt print job is received will be described. FIGS. 4A and 4B are flowcharts illustrating a flow of processing in a case where an interrupt job I having a higher priority is imported while printing of a prior job is being performed. Because the flow from job reception to printing is as described above, the repetitive description will be omitted.

In step S401, RIP is performed which rasterizes the interrupt job I acquired from a job queue to a printing bitmap image in the image processing unit 207. Next, in step S402, the position where the interrupt job I may be generated within a prior job that is being printed (called an interrupted job Y) is identified, and a user is prompted to select an interrupt position via a screen illustrated in FIG. 6. Step S402 includes calculating candidate interrupt positions in the interrupted job Y, displaying them by the operating unit 206, and identifying a candidate selected by the user from them. Step S402 will be described in detail below and in reference to FIG. 5.

In step S403, whether a user operation corresponds to "cancel" or not is determined. If "cancel" is selected, the processing moves to step S404. Print data relating to the interrupt job I and the instance of the job may be deleted, and the processing ends. If it does not correspond to "cancel", it means that one of the interrupt position candidates is selected. Thus, the processing moves to step S405.

In step S405, whether printing has completed to the selected interrupt planned position in the interrupted job Y or not is determined. If it is still in printing, the printing is continued to the interrupt planned position. When the printing has completed to the planned position, the processing moves to step S406.

In step S406, whether the printing for the interrupt job I is possible continuously after the interrupt planned position in the interrupted job Y or not is determined. If possible, the processing moves to step S414. A requirement for determination that the printing for the interrupt job I is performed continuously to the interrupted job Y may refer to a state that the jobs have a same sheet type and print attribute and printing is being performed on a first surface for a double-side printing job, for example, or a state that printing is being performed on one surface (first surface) for a one-side print job. On the other hand, if it is determined in step S406 that continuous printing of the interrupt job I is not possible, the processing moves to step S407 where the sheet is cut.

In subsequent step S408, whether printing on the second surface for the interrupted job Y is required or not is determined. If it is required, the processing moves to step S409. In step S409, the sheet winding unit 113 reverses the sheet. In next step S410, printing is performed on the second surface for the interrupted job Y.

Next, in step S411, the sheet having printing for the second surface completed is cut into pages. The cut sheets are discharged to a tray in next step S412 and the processing moves to step S414.

If it is determined in step S408 that printing on the second surface is not required in the interrupted job Y, the processing moves to step S413 where whether any sheet is to be discarded or not is determined. The sheet to be discarded here is a sheet having an incomplete printed state like the state 804 in FIG. 8B, for example (a sheet discharged without printing on the second surface which is required originally). Such sheet discarding occurs when an immediate interrupt is designated while printing on the first surface is being performed for double-side printing. A sheet to be discarded is cut into proper size in step S411 and then is discharged to a discard tray in the sorting unit 114, for example, in step S412.

In step S414, printing on the first surface is performed for the interrupt job I. In step S415, the sheet is then cut. In step S416, whether the interrupt job I is for double-side printing or not is determined. If it is for double-side printing, the reverse process is performed in step S417. Printing on the second surface for the interrupt job I is then performed in step S418, and the processing moves to step S419. If it is determined in step S416 that it is not for double-side printing, the processing moves to step S419.

In step S419, whether the printing on the second surface for the interrupted job Y may be performed continuously to the printing on the second surface for the interrupt job I or not is determined. If so, the processing moves to step S420. If not, the processing moves to step S421.

In step S420, printing on the second surface for the interrupted job Y is performed (continued from where interrupted). Next in step S421, the sheet is cut into pages, and the cut sheets are then discharged to a tray in step S422. In step S423, whether any unprinted pages exist for the interrupted job Y is determined. If so in step S423, the processing moves to step S424 where the unprinted pages are printed. If not, the processing ends.

Figure 5:
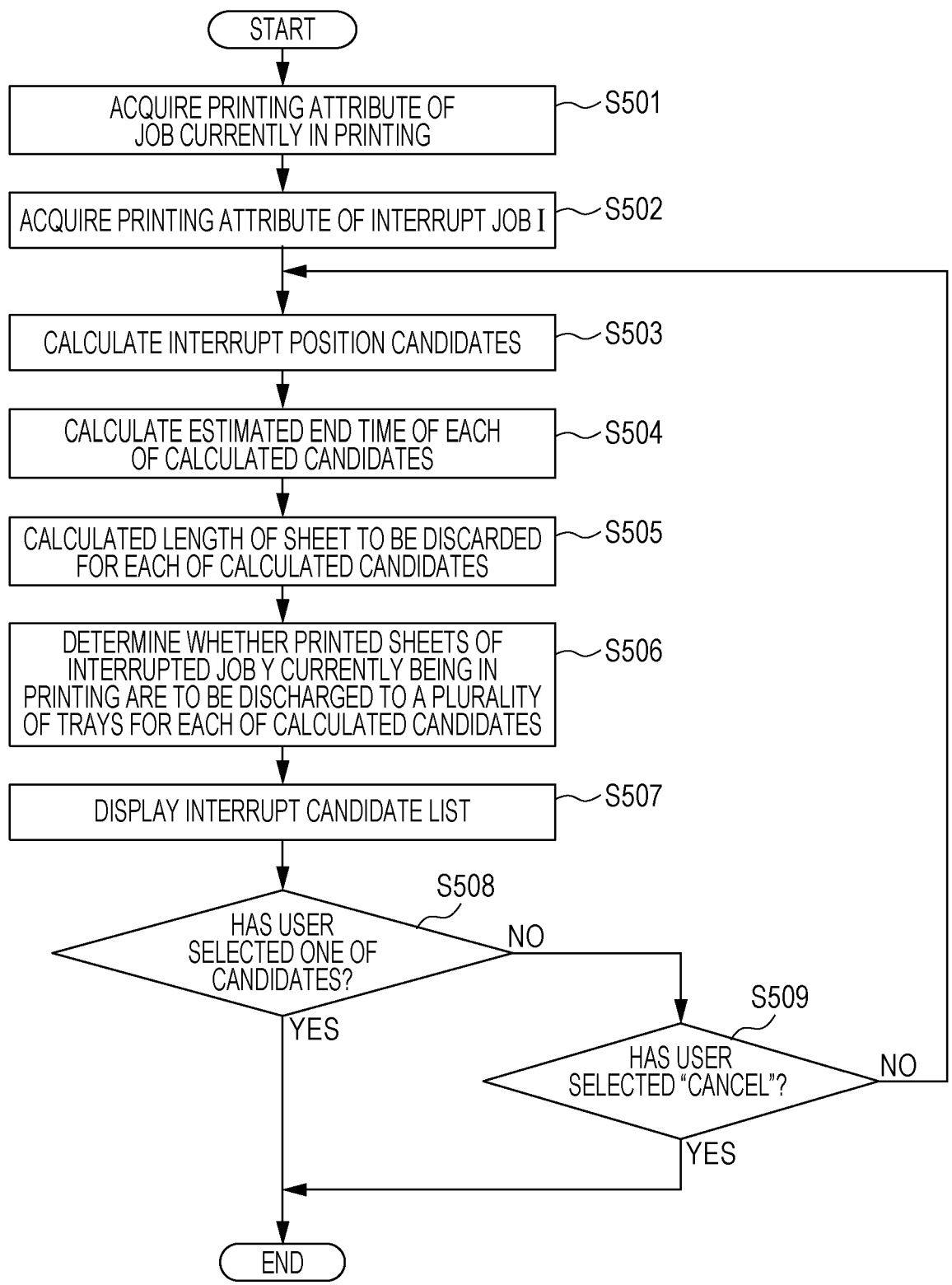
FIG. 5 is a flowchart illustrating a flow of processing according to an embodiment.

Next, the processing in step S402 in FIG. 4A will be described in detail with reference to FIG. 5. In step S501, a print attribute of the interrupted job Y that is currently being printed is acquired. In step S502, a print attribute of the interrupt job I is acquired.

In step S503, a candidate (or a plurality of candidates if any) of the position where the interrupt job I is issued in the interrupted job Y is calculated on the basis of the print attributes of the jobs acquired in step S502 and the progress of the printing that is currently being performed. The candidate may be "immediately" (an end of the page that is being currently printed), an end of the copy that is being currently printed, an end of a job (before printing on the second surface if the job is for double-side printing), or the end of a group of a plurality of jobs (before printing on the second surface if the jobs are for double-side printing), for example. It may further be after the current job completes (after the printing on the first surface and second surface completes if the current job is for double-side printing), after a group of a plurality of jobs completes (after the printing on the first surface and second surface completes if the plurality of jobs are for double-side printing). Next in step S504, the estimated termination time of the current printing is calculated if the interrupt job is issued at each of the calculated interrupt position or positions.

In step S505, the length of a sheet to be discarded is calculated for each of the candidate position or positions calculated in step S503.

In next step S506, whether the resulting sheets of the interrupted job Y are to be discharged to a plurality of trays or not is determined with respect to the candidate position or positions calculated in step S503.

A sheet discharge destination in a job will be described next. For double-side printing, the sheet winding unit 113 is used to reverse a sheet, and resulting sheets are discharged in order from the page printed last on the first surface to a tray or trays. For example, when an interrupt job I for double-side printing is issued after the third page on the first surface in an interrupted job Y for double-sided printing of a copy of 5 pages, the sheet is reversed after the printing on the first surface of the interrupt job I completes. Then, printing is performed continuously on the second surface of the interrupt job I and the second surface of the interrupted job Y. The resulting sheets of the interrupt job I are discharged, and the sheets of the interrupted job Y are then discharged in order from the interrupted page (in order of pages 3, 2, 1). Then, after the double-side printing is performed on the unprinted pages 4 and 5 of the interrupted job in the same manner, the sheets are discharged in order of pages 5 and 4. Because of this, discharging the page of the interrupted job Y before the interrupt job I is issued and the page of the interrupted job Y after the interrupt job I is issued to a same tray may result in the disorder of pages. Accordingly, in this embodiment, when an interrupt job I is issued in middle of a copy for an interrupted job Y, the page of the interrupted job Y before the interrupt job I is issued and the page of the interrupted job Y after the interrupt are discharged to different trays. In other words, when an interrupt job I is issued in middle of a copy for the interrupted job Y, the sheets of the copy are divided and discharged to two trays. In step S506, it is determined that the sheets are divided and discharged to a plurality of trays.

Alternatively, the sheet discharge destination of jobs may be set to different trays for each job or may be set to different trays for each group of a plurality of jobs. If one job contains a plurality of copies, the discharge destination may be set to different trays for each copy. The discharge destination of a job may be preset or may be set by a user as required. According to this embodiment, the discharge destination is set to different trays for each job or for each copy if one job contains a plurality of copies. When the position where an interrupt job I is issued is not in middle of a copy for of an interrupted job Y, the page of the interrupted job Y before the interrupt job I is issued and the page of the interrupt job I after the interrupt may be discharged to a same tray.

Figure 6:
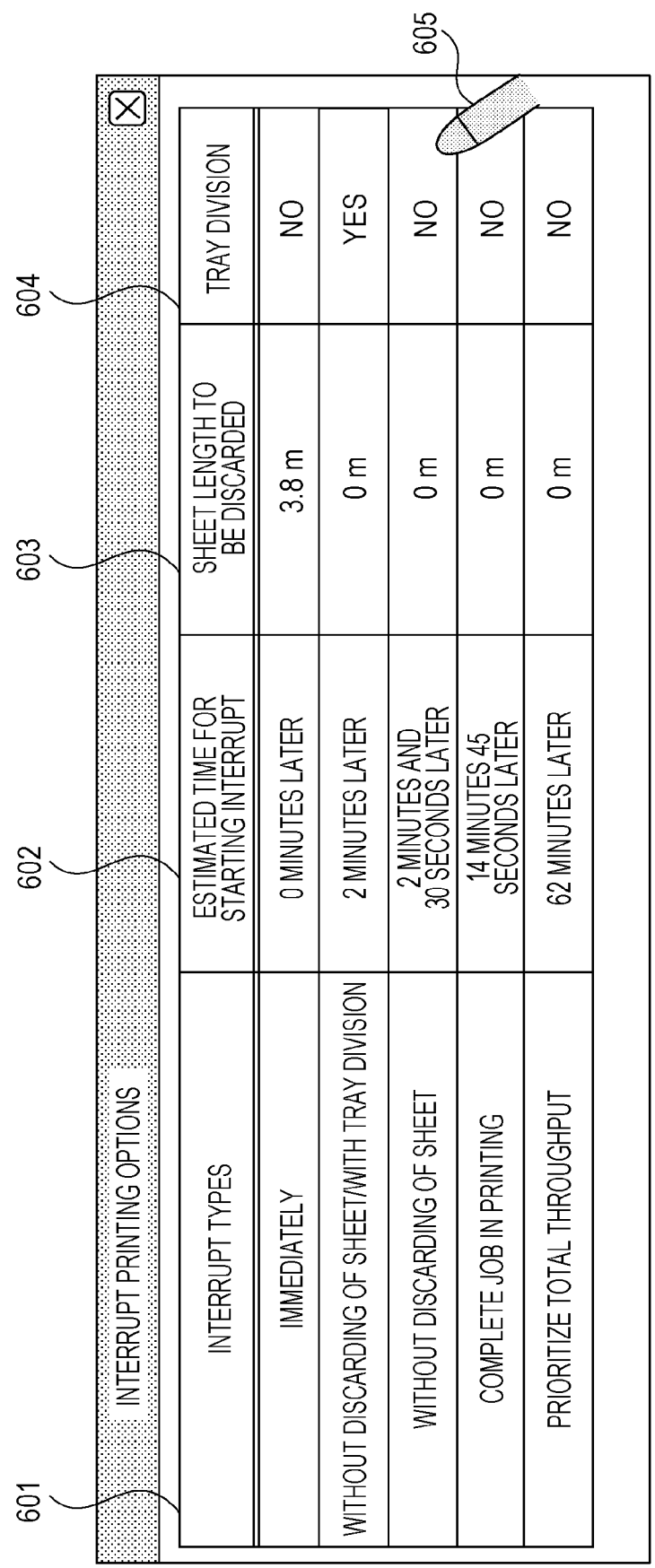
FIG. 6 illustrates a screen on which an interrupt type may be instructed.

In step S507, the information calculated in step S503 to step S506 is displayed on a screen as illustrated in FIG. 6 in the operating unit 206. FIG. 6 illustrates interrupt types 601 that are calculated in step S503 and are currently selectable by a user. Estimated times 602 are times when an interrupt job may be started for each of interrupt types, which is calculated in step S504. A discarded sheet length 603 is the length of a sheet to be discarded estimated for each of the interrupt type, which is calculated in step S505. A tray division 604 indicates whether the sheets in the interrupt job Y are to be divided and are discharged to a plurality of trays, which is determined in step S506. The interrupt type selected by a user is denoted by the reference numeral 605. Such an interrupt type may be determined when one of rows is selected on the screen or may be determined in accordance with a predetermined operation on the operating unit 206 after a row is selected. The type "IMMEDIATELY" under the interrupt type 601 refers to an interrupt type with which the interrupt position calculated in step S503 is "IMMEDIATELY" and discarding of a sheet is allowed. For example, if an interrupted job Y is issued in middle of printing on the first surface for double-side printing or in middle of printing on the second surface, the sheet on which printing is being performed is discarded. The type "WITHOUT DISCARDING OF SHEET/WITH TRAY DIVISION" under the interrupt type 601 is an interrupt type with which the interrupt position calculated in step S503 is "an end of the copy that is being currently printed" and no sheet is to be discarded but the interrupted job Y allows the division of the sheets to a plurality of tray. The type "WITHOUT DISCARDING OF SHEET" under the interrupt type 601 is an interrupt type with which no sheet is to be discarded and the interrupted job Y allows division of sheets to a plurality of tray. The interrupt position calculated in step S503 is "an end of the copy that is being currently printed" or "an end of a job". According to this embodiment, the discharge destination is set to different trays for each job or for each copy if one job contains a plurality of copies. Thus, the interrupt position calculated in step S503 corresponds to "an end of the copy that is being currently printed". The type "COMPLETE JOB IN PRINTING" under the interrupt type 601 is an interrupt type with which an interrupt job I is issued after the printing on the first surface and second surface completes if the interrupted job Y is for double-side printing. The type "PRIORITIZE TOTAL THROUGHPUT" under the interrupt type 601 is an interrupt type with which a total throughput is the shortest when the interrupt job I and an interrupted job Y are executed.

The total throughput will be described next. An interrupted job Y and an interrupt job I apply different sheet types, replacing the sheet takes time. Therefore, the number of times of replacing the sheet may have an influence on the total time for execution of the interrupt job I and the interrupted job Y. In a case where an interrupted job Y and an interrupt job I apply different sheet types, when the interrupt job is issued in middle of printing of the interrupted job, the sheet is replaced once before printing of the interrupt job and once after the printing of the interrupt job and before printing on an unprinted page of the interrupted job. Thus, when the interrupt job is issued during an interrupted job, a long time may be required totally for execution of the interrupt job and the interrupted job. In a case where an interrupted job is for double-side printing and an interrupt job is for one-side printing, the number of times of reversing a sheet may have an influence on the total time for execution of the interrupt job and the interrupted job. When an interrupt job for one-side printing is issued in middle of printing on the first surface of the interrupted job, the sheet is reversed once in middle of printing on the first surface of the interrupted job and before the interrupt printing and once after printing on an unprinted page on the first surface of the interrupted job. Thus, a longer time is required totally for execution of the interrupt job and the interrupted job, compared with a case where the interrupt job is printed after printing on all of the first surface of the interrupted job is performed and printing on the second surface of the interrupted job is then performed.

In step S508, whether a user has selected one candidate from a displayed candidate list or not is determined. If a candidate has been selected, the processing ends and moves to step S405. If not in step S508, whether a user has performed a cancel operation or not is determined in step S509. If so, the processing ends and moves to step S404. If not in step S509, the processing returns to step S503 again. The changed progress of printing is reflected for the calculation of interrupt position candidates, and the information on the display screen in FIG. 6 in the operating unit 206 is also updated. In this way, when an interrupt job I is imported, a candidate or candidates for the interrupt position is or are presented to a user, and the user is prompted to select one. This allows a user to select whether the interrupt is possible or not and an interrupt type under various conditions.

Figure 7A:
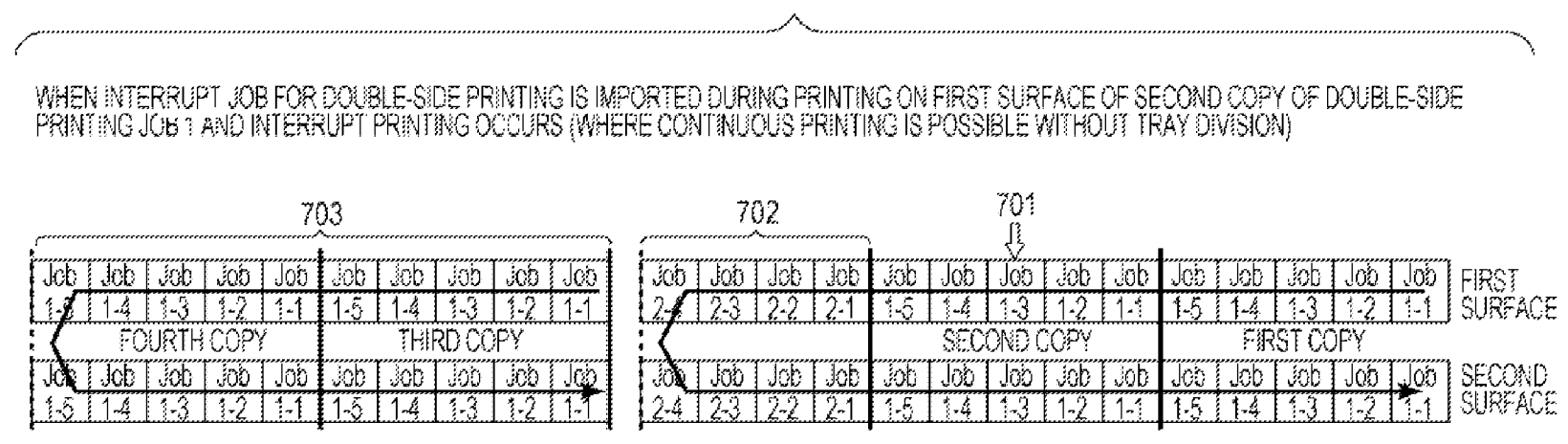

An example of printing to be executed in accordance with the aforementioned interrupt sequence will be described with reference to FIGS. 7A to 7C. FIG. 7A illustrates a case where an interrupt job 2 (702) for double-side printing is imported during printing (at position 701) on the first surface of a second copy for a job 1 when double-side printing for four copies is designated. In FIG. 7A, an interrupt position for "WITHOUT DISCARDING OF SHEET" is selected at step S508 (FIG. 5)/S402 (FIG. 4A). In this example, an interrupt type 601 "WITHOUT TRAY DIVISION FOR EACH COPY" is selected, that is, the interrupt job 2 is imported at an end of a copy. Printing on the first surface for the interrupt job 2 is performed at step S414 in FIG. 4B (without cutting the sheet at step S407 in FIG. 4A) continuously to the printing on the first surface of the second copy for the interrupted job 1. After that, the sheet is cut at step S415 and is reversed at step S417. Printing is performed sequentially on the second surface for the interrupt job 2 at step S418, the second surface of the second copy for the interrupted job 1 at step S420, and the second surface of the first copy for the interrupted job 1 at step S420. For the jobs having undergone printing, the sheets of the interrupt job 2, the sheets of the second copy for the interrupted job 1, and the sheets of the first copy for the interrupted job 1 are discharged at step S422 in that order to different trays from each other. The reference numeral 703 denotes printing at S424 in FIG. 4B on the remaining copies (third copy and fourth copy) for the interrupted job 1 continued after the interrupt printing completes.

FIG. 7B illustrates a case where a one-side printing interrupt job 2 (705) is imported during printing (at position 704) on the first surface of a second copy for an interrupted job 1 when double-side printing for four copies is designated. In FIG. 7B, an interrupt position for "WITHOUT DISCARDING OF SHEET" is selected at step S508 (FIG. 5)/S402 (FIG. 4A). In this example, an interrupt type "WITHOUT TRAY DIVISION FOR EACH COPY FOR INTERRUPTED JOB Y" is selected, that is, the interrupt job 2 is imported at an end of a copy for the interrupted job Y. In this case, the interrupted job 1 and the interrupt job 2 have different print attributes (NO at step S406 in FIG. 4A), and printing for the interrupt job 2 is not performed continuously. Therefore, printing is performed up to the second copy for the interrupted job 1 first, and the resulting sheets are discharged. In other words, printing is performed at step S410 on the second surface of the second copy for the interrupted job 1, and the sheets of the first copy and second copy for the interrupted job 1 are cut at step S411 and discharged at step S412. After that, printing is performed for the interrupt job 2, and the sheet is cut at step S421 in FIG. 4B, and the resulting sheets are discharged at step S422. The reference numeral 706 denotes the third copy and fourth copy for the interrupted job 1 which is restarted at step S424 after the printing for the interrupt job 2 completes.

FIG. 7C illustrates a case where a double-side printing interrupt job 2 (708) is imported during printing (at position 707) on the first surface of a second copy for a job 1 when double-side printing for four copies is designated. In FIG. 7C, an interrupt position for "WITHOUT DISCARDING OF SHEET, WITH TRAY DIVISION" is selected at step S508 (FIG. 5)/S402 (FIG. 4A) as the interrupt type 601 in FIG. 6. In this example, the interrupt job 2 is imported at an end of a page of the interrupted job 1 (YES at step S406 in FIG. 4A) immediately after the interrupt job 2 is imported. Here, in FIG. 7C, pages 1-3 of the second copy are printed separately from pages 4-5 whereas, in FIG. 7A, pages 1-5 of the second copy are printed together. Printing on the first surface of the job 2 is performed at step S414 in FIG. 4B continuously (without cutting the sheet at step S407) to printing on the first surface in middle of the second copy (after page 1-3 on the first surface) for the interrupted job 1. Then, after the sheet is cut at step S415 and is reversed at step S417, printing is sequentially performed on the second surface of the interrupt job 2 at step S418, the second surface of the page having its first surface already printed of the second copy for the interrupted job 1 at step S420, and the second surface of the first copy for the interrupted job 1 at step S420. From the jobs having undergone printing, the sheets of the interrupt job 2, the sheets of a part of the second copy for the interrupted job 1, and the sheet of the first copy for the interrupted job 1 are sequentially discharged at step S422 to different trays. The sheets of a part of the second copy for the interrupted job 1 are discharged in order of pages 1-3, 1-2, and 1-1 (see FIG. 7C adjacent to position 707). The reference numeral 709 in FIG. 7C denotes printing on the remaining copies (the remaining pages of the second copy, third copy and fourth copy) for the interrupted job 1 continued at step S424 after the interrupt printing at step S418 and step S420 completes. Because the remaining sheets of the second copy are discharged in order of pages 1-5 and 1-4, the sheets are discharged to a different tray than the tray for the sheets of the second copy discharged before interrupted.

According to this embodiment, interrupt printing may be executed at an end of a copy (such as at the end of the second copy in FIG. 7A and FIG. 7B) or at an end of a page (such as at the end of page 1-3 of the second copy in FIG. 7C) and printed sheets are discharged to a different tray without wasting the sheets having its first surface printed. Interrupt position candidates calculated at step S503 in FIG. 5, an estimated interrupt starting time calculated at step S504, the length of a sheet to be discarded calculated at step S505, and the presence of tray division (step S506) are presented. A user may select an interrupt type 601 in accordance with the presented information so that the user may select a desired interrupt type. In the description above, the processes excluding printing may be implemented by a host apparatus or an external apparatus such as an external control unit, and the image forming apparatus may execute a job under its control. In this case, the external apparatus may acquire necessary information such as the status of a job from the image forming apparatus to perform the processes. This embodiment may be implemented by execution of the following processes. That is, processes may be executed by software (program) that implements functions of the exemplary embodiment and is supplied to a system or an apparatus over a network or through a storage medium, wherein a computer (or CPU, MPU, or the like) in the system or apparatus may read and execute the program. Such program may be executed by one computer or may be executed by a plurality of computers together. All of the processes may not be implemented by software, but a part or all of them may be implemented by hardware.

The present invention is not limited to the aforementioned embodiment, but various modifications (including application to other embodiments and combinations with other embodiments) without departing from the scope and spirit of the present invention.

According to the present invention, a plurality of options for interrupt printing are presented along with the amount of incompletely printed sheet to be discharged and how the sheet or sheets in the prior job is or are to be discharge, and the interrupt printing is executed in accordance with the option designated on the basis of the information so that the interrupt printing may be executed in proper timing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088707, filed Apr. 19, 2013, which is hereby incorporated by reference herein in its entirety.

What is claimed is:

1. An apparatus comprising:
a presenting unit configured to present, to a user and while images are being printed on one of two surfaces of a continuous sheet in accordance with a prior two-sided job, a screen having a plurality of options for interrupt printing of an interrupt job, an estimated length of a sheet material to be discarded for each option, and a sheet discharging method of the prior two-sided job; and
a control unit configured to interrupt a prior two-sided job, wherein, if one option of the plurality of options presented by the presenting unit is designated by the user, the control unit interrupts the prior two-sided job in timing according to the designated option to execute the interrupt job.

2. The apparatus according to claim 1, wherein, when the prior two-sided job is for printing a plurality of copies, the timing is an end of a copy.

3. The apparatus according to claim 1, wherein the timing is an end of a page for the prior two-sided job.

4. The apparatus according to claim 1, wherein the sheet discharging method is based on whether sheets in the prior two-sided job are to be divided and discharged to a plurality of discharge destinations.

5. The apparatus according to claim 1, wherein the presenting unit further presents information describing an interrupt starting time for each of the plurality of options.

6. The apparatus according to claim 1, further comprising a printing unit.

7. The apparatus according to claim 1, wherein the control unit causes a printing unit to successively print images on a first surface of the continuous sheet and then to print images on a second surface of the continuous sheet from a side of a last image printed on the first surface of the continuous sheet.

8. The apparatus according to claim 1, wherein the control unit causes a printing unit to successively print images of the interrupt job on a first surface of the continuous sheet containing images of the prior two sided-job and then to print images of the interrupt job and prior two-sided job on a second surface of the continuous sheet from a side of a last image printed on the first surface of the continuous sheet.

9. The apparatus according to claim 1, wherein the plurality of options for interrupt printing of the interrupt job is based on a printing end.

10. The apparatus according to claim 9, wherein, in response to determining that the user has performed a cancel operation, the presenting unit refrains from updating the screen and data relating to the interrupt job is deleted.

11. The apparatus according to claim 1, wherein, while one option of the plurality of options presented by the presenting unit is not designated by the user, the presenting unit updates the screen based on process of printing of the prior two-sided job.

12. The apparatus according to claim 1, wherein the presenting unit is a means for presenting the screen and the control unit is a means for interrupting a prior two-sided job.

13. The apparatus according to claim 1, wherein, in a case where it is determined that printing on a second surface of the continuous sheet for the prior two-sided job is required, the prior two-sided job is completed before the interrupt job is executed.

14. A method for an apparatus, the method comprising:
presenting, to a user and while images are being printed on one of two surfaces of a continuous sheet in accordance with a prior two-sided job, a screen having a plurality of options for interrupt printing of an interrupt job, an estimated length of a sheet material to be discarded for each option, and a sheet discharging method of the prior two-sided job; and interrupting, if one option of the presented plurality of options is designated by the user, the prior two-sided job in timing according to the designated option to execute the interrupt job.

15. The method according to claim 14, wherein, when the prior two-sided job is for printing a plurality of copies, the timing is an end of a copy.

16. The method according to claim 14, wherein the timing is an end of a page for the prior two-sided job.

17. The method according to claim 14, wherein the sheet discharging method is based on whether sheets in the prior two-sided job are to be divided and discharged to a plurality of discharge destinations.

18. The method according to claim 14, wherein presenting further includes presenting information describing an interrupt starting time for each of the plurality of options.

19. A non-transitory storage medium storing a program to cause a computer to execute a method for an apparatus, the method comprising:

presenting, to a user and while images are being printed on one of two surfaces of a continuous sheet in accordance with a prior two-sided job, a screen having a plurality of options for interrupt printing of an interrupt job, an estimated length of a sheet material to be discarded for each option, and a sheet discharging method of the prior two-sided job; and interrupting, if one option of the presented plurality of options is designated by the user, the prior two-sided job in timing according to the designated option to execute the interrupt job.

* * * * *